Sept. 9, 1924.

R. N. CONWELL 1,508,362

ELECTRICAL METHOD AND APPARATUS

Original Filed May 11, 1921    2 Sheets-Sheet 1

Inventor:
Rollin N. Conwell,
Delos G. Haynes,
Attorney.

Sept. 9, 1924.  R. N. CONWELL  1,508,362
ELECTRICAL METHOD AND APPARATUS
Original Filed May 11, 1921   2 Sheets-Sheet 2
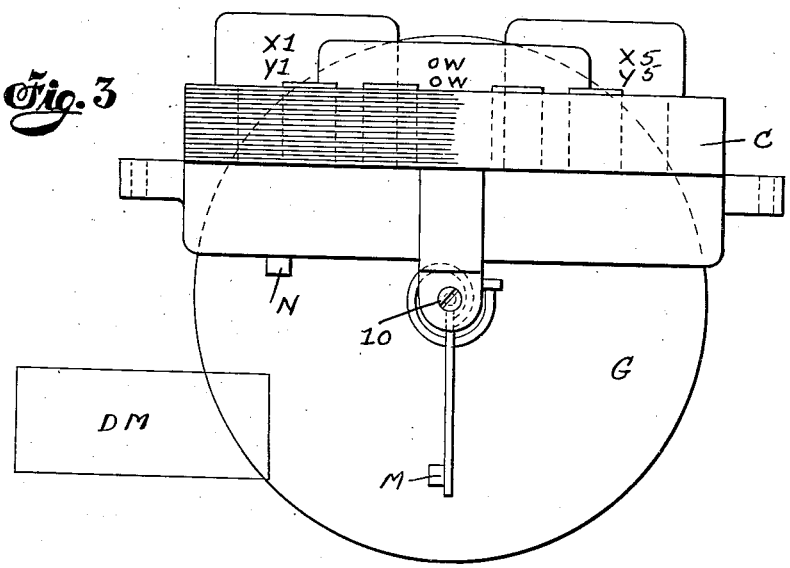

Patented Sept. 9, 1924.

1,508,362

UNITED STATES PATENT OFFICE.

ROLLIN N. CONWELL, OF BLOOMFIELD, NEW JERSEY.

ELECTRICAL METHOD AND APPARATUS.

Application filed May 11, 1921, Serial No. 468,587. Renewed February 8, 1923.

*To all whom it may concern:*

Be it known that I, ROLLIN N. CONWELL, a citizen of the United States, and a resident of Bloomfield, county of Essex, State of New Jersey, have invented an Improvement in Electrical Methods and Apparatus, of which the following is a specification.

This invention relates to electrical methods and apparatus, and with regard to certain more specific features, to methods and apparatus for use in connection with alternating currents.

Among the several objects of the invention may be noted the provision of inexpensive and durable electrical apparatus for effecting the various results hereinafter indicated, utilizing inductive action; and the provision of simple and reliable methods of attaining such results. Other objects will be in part obvious and in part pointed out hereinafter.

The invention accordingly comprises the features of construction, steps and sequence of steps, combinations of elements and arrangements of parts, which are exemplified in the description hereinafter in connection with the accompanying drawings, and the scope of the application of which will be indicated in the following claims.

In the accompanying drawings, in which is illustrated diagrammatically one of various possible embodiments of the invention, Fig. 1 is an elevation of one form of apparatus;

Fig. 3 is a plan of the parts shown in Fig. 1, excluding the connections.

Similar reference characters indicate corresponding parts throughout the several views of the drawings.

Figure 1.

Figure 1:
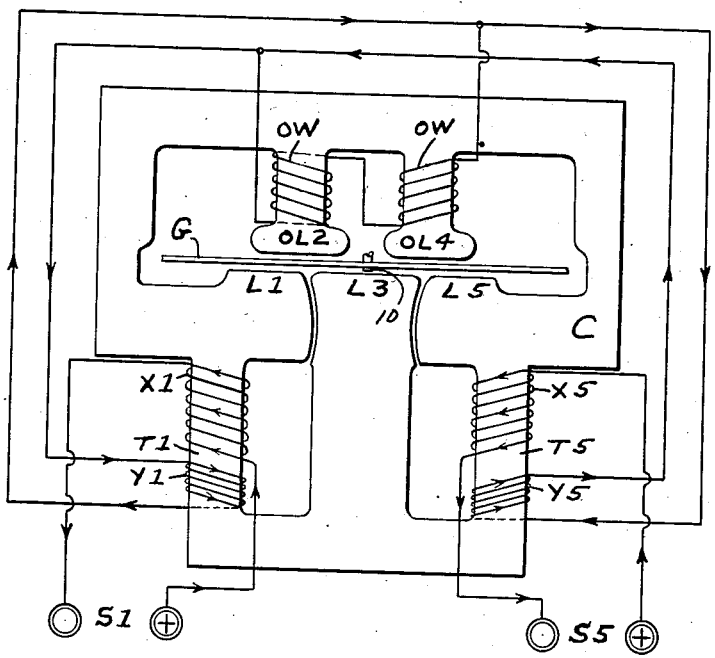

*Construction.*—Referring now more particularly to Fig. 1, there are illustrated at $S^1$, $S^5$, two sources of alternating current, which may be derived from one or more circuits; a transformer $T^1$, $T^5$ for each of said respective sources; an induction device such as the primary winding $X^1$, $X^5$ for each of said respective transformers; a leg or pole piece or core element $L^1$, $L^5$ for each of said respective transformers; and a secondary winding $Y^1$, $Y^5$ for each of said respective transformers.

The transformer fluxes are due to the magneto-motive forces of the ampere turns of the primary and secondary windings of the respective transformers.

Another flux is induced by current passing through two other windings OW connected across equipotential points of the secondary windings $Y^1$, $Y^5$, which are connected in series with one another. The flux caused by current in these other windings, if other than zero, cooperates with the transformer fluxes. These several fluxes induce electric currents in one or more conductors for some useful purpose. In the present embodiment of the invention (see Figs. 1 and 3) the conductor is a movable element, to wit, a disc G pivoted as at 10 to one side of the plane of the laminated core C. The disc is driven by the vectorial sum of the forces acting upon it, that is, the resultant force arising from the reaction of the resultant flux and the flux caused by the electric currents induced thereby in the driven element G. The driven element G may simply allow an observer to determine its position and/or direction of movement, as in synchronizers. Or the driven element may deliver mechanical power for power purposes, or run a totalizer or operate a pointer or recording device (stylus or the like) or contacts or the like.

In the present instance the apparatus is illustrated as a relay, and the disc G is normally stationary. Upon any departure from normal condition, the disc tends to rotate in one direction or the other, retarded if desired by one or more drag magnets DM (Fig. 3) and the torque developed is determined by the magnitude of the abnormality that causes the torque. Such torque may be used for any of the several purposes above named, for which such torque may be suitable.

*Normal condition.*—In tracing the several currents and fluxes during normal condition, assume the two sources of power $S^1$, $S^5$ to be in phase, and the ampere turns in the two primaries equal, and assume an instant when the right-hand conductor at each source of power is plus, as indicated at Fig. 1. At this time, current in primary $X^1$ flows to the left on the front side of the winding, inducing in secondary $Y^1$ a current flowing to the right on the front side of the latter winding. Current in primary $X^5$ flows to the left on the front side of the winding, inducing in secondary $Y^5$ a current flowing to the right on the front side of the latter winding. As there is no current in winding OW, there is zero flux in the legs $OL^2$, $OL^4$. As there is no traveling field acting on the disc, the disc does not rotate.

*Abnormal condition I—Caused by relative increase of current at source $S^1$.*—In tracing the several currents and fluxes upon a departure from normal condition, assume the currents at the sources of power $S^1$, $S^5$ in phase, and the current at the source $S^1$ larger than normal with respect to current at source $S^5$. At this time, the directions of the several currents are the same as during normal condition. The fluxes, however, are different. The transformer flux flowing through legs $L^1$ and $L^3$ is of greater magnitude than the transformer flux flowing through legs $L^3$ and $L^5$. The current in the secondary $Y^1$ is thus greater than the current in the secondary $Y^5$. The current in winding OW is no longer zero, but has a magnitude determined by the extent of inequality between the ampere turns in the two secondaries $Y^1$, $Y^5$. That is, the larger the difference between the currents in the secondaries, the larger is the other flux; and with the current in winding $Y^1$ predominating, the other flux has one phase relation with the transformer fluxes, while if the current in secondary $Y^5$ were predominating the other flux would have a different phase relation with the transformer fluxes.

(A) Assume the instant when the right-hand conductor at each source of power is plus. The leg $L^1$ at the portion adjacent the disc G is therefore zero, and the same is true of the leg $L^5$, so far as the transformer fluxes therein are concerned. The leg $L^3$ is of opposite polarity to legs $L^1$, $L^5$ and is also zero. The flux due to winding OW in this instance lags behind the transformer fluxes. The extent of lag, for the purpose of the analysis hereinafter, may be considered as nominally ninety degrees; for brevity the term quadrature is used herein as indicating any out-of-phase relationship (not necessarily ninety degrees) that will effect the respective action specified. The upper legs $OL^2$, $OL^4$ are thus minus and plus, respectively. At this instant, then, the five legs $L^1$, $OL^2$, $L^3$, $OL^4$, $L^5$ are respectively zero, minus, zero, plus, zero.

(B) Assume now an instant one-quarter cycle later. The two terminals at each source of power are now of zero potential, producing zero current in each primary $X^1$, $X^5$; there is thus minus polarity at legs $L^1$ and $L^5$ and plus at leg $L^3$. Since the other flux lags ninety degrees behind the transformer fluxes, said other flux is now zero at the legs $OL^2$ and $OL^4$. At this instant, then, the five legs are respectively minus zero, plus, zero, minus, which means that the plus polarity has traveled from leg $OL^4$ to leg $L^3$.

(C) Assume now an instant another one-quarter cycle later. The right-hand terminal at each source of power is now minus, and the several currents and fluxes are thus one-half cycle behind their directions and values at the initial instant, indicated in paragraph A above. The five legs are thus now respectively zero, plus, zero, minus, zero, which means that the plus polarity has traveled from leg $L^3$ to leg $OL^2$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The five legs are thus now respectively plus, zero, minus, zero, plus, which means that the plus polarity has traveled from leg $OL^2$ to leg $L^1$, and appears at leg $L^5$.

(E) Assume now an instant another one-quarter cycle later, that is, an entire cycle later than the condition in paragraph A. The five legs are now of the same polarity as at the instant in paragraph A, namely, respectively zero, minus, zero, plus, zero, which means that the plus polarity has traveled from leg $L^5$ to leg $OL^4$.

The traveling field thus produced causes electric currents in the disc G, and the reaction between said flux or field and the flux caused by said currents produces torque in the disc, tending to rotate the disc clockwise (Fig. 3).

*Abnormal condition II—Caused by relative increase of current at source $S^5$.*—Next may be traced the several currents and fluxes when the departure from normal condition is caused by the current at the source $S^5$ becoming larger than normal with respect to the current at source $S^1$.

(A) Assume first the instant when the right-hand conductor at each source of power is plus. The leg $L^1$ at the portion adjacent the disc G is now zero, and the same is true of the leg $L^5$, so far as the transformer fluxes therein are concerned. The leg $L^3$ is of opposite polarity to legs $L^1$, $L^5$ and is also zero. The flux due to winding OW may be considered as ninety degrees ahead of the transformer fluxes. At the instant in question, the leg $OL^2$ is plus and the leg $OL^4$ is minus. At this instant, then, the five legs are respectively zero, plus, zero, minus, zero.

(B) Assume now an instant one-quarter cycle later. The two terminals at each source of power are now of zero potential, producing zero current in each primary $X^1$, $X^5$; there is thus minus polarity at leg $L^1$, $L^5$. Since the other flux leads the transformer fluxes by ninety degrees, said other flux is now zero at legs $OL^2$ and $OL^4$. At this instant, then, the five legs are respectively minus, zero, plus, zero, minus, which means that the plus polarity has traveled from leg $OL^2$ to leg $L^3$, or in an opposite direction to its direction of travel during the corresponding quarter-cycle A—B during abnormal condition I.

(C) Assume now an instant another one-quarter cycle later. The left-hand terminal at each source of power is now plus, and the several currents and fluxes are thus one-half cycle behind their directions and values at the initial instant A. The five legs are thus now respectively zero, minus, zero, plus, zero, which means that the plus polarity has traveled from leg $L^3$ to leg $OL^4$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The five legs are thus now respectively plus, zero, minus, zero, plus, which means that the plus polarity has traveled from leg $OL^4$ to leg $L^5$ and also appears at leg $L^1$.

(E) Assume now an instant another one-quarter cycle later, that is, an entire cycle later than the condition in paragraph A. The five legs are now of the same polarity as at the instant in paragraph A, namely, respectively zero, plus, zero, minus, zero, which means that the plus polarity has traveled from leg $L^1$ to leg $OL^2$.

The disc thus tends to rotate counterclockwise (Fig. 3).

Figure 2:
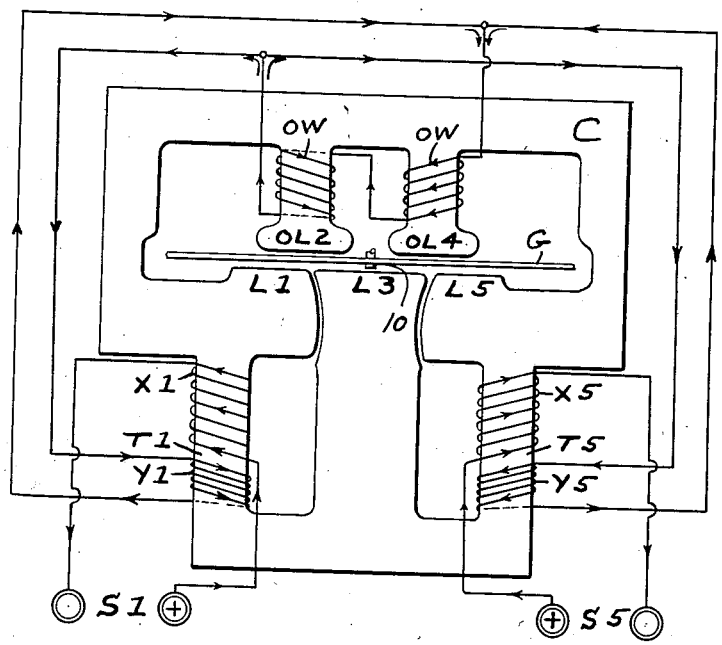
Fig. 2 is a similar view, under different circuit conditions.

*Figure 2.*

Abnormal condition III—Caused by relative increase of current at source $S^1$ and reversal of current at source $S^5$.—In tracing the several currents and fluxes upon a departure from normal condition caused by relative increase of current at source $S^1$ as in abnormal condition I, but with reversal of current at source $S^5$. Assume the directions of the several currents as in Fig. 2. The transformer flux flowing through leg $L^1$ is of greater magnitude than the transformer flux flowing through leg $L^5$. The currents in the secondaries $Y^1$, $Y^5$ oppose (instead of circulating, as before) and the current in the other winding OW is thus greater, for given inequality of currents at the sources, than under abnormal condition I. Furthermore, the current now flows through winding OW in a direction unaffected by relative magnitude of currents at the two sources.

(A) Assume the instant when the right-hand conductor at each source of power is plus. The leg $L^1$ at the portion adjacent the disc G is therefore zero. The leg $L^5$ may be disregarded. The leg $L^3$ is of opposite polarity to leg $L^1$, and is also zero. The flux due to winding OW in this instance lags ninety degrees behind the transformer fluxes. The upper legs $OL^2$, $OL^4$ are thus minus and plus, respectively. At this instant, then, the legs $L^1$, $OL^2$, $L^3$, $OL^4$ are respectively zero, minus, zero, plus.

(B) Assume now an instant one-quarter cycle later. The two terminals at each source of power are now of zero potential, producing zero current in each primary $X^1$, $X^5$; there is thus minus polarity at leg $L^1$ and plus at leg $L^3$. Since the other flux lags ninety degrees behind the transformer fluxes, said other flux is now zero at the legs $OL^2$ and $OL^4$. At this instant, then, the legs are respectively minus, zero, plus, zero, which means that the plus polarity has traveled from leg $OL^4$ to leg $L^3$.

(C) Assume now an instant another one-quarter cycle later. The right-hand terminal at each source of power is now minus, and the several currents and fluxes are thus one-half cycle behind their directions and values at the initial instant, indicated in paragraph A above. The legs are thus now respectively zero, plus, zero, minus, which means that the plus polarity has traveled from leg $L^3$ to leg $OL^2$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively plus, zero, minus, zero, which means that the plus polarity has traveled from leg $OL^2$ to leg $L^1$.

(E) Assume now an instant another one-quarter cycle later, that is, an entire cycle later than the condition in paragraph A. The legs are now of the same polarity as at the instant in paragraph A, namely, respectively zero, minus, zero, plus, which means that the plus polarity has disappeared from leg $L^1$ and appears at leg $OL^4$.

The torque is thus in the same direction tending to rotate the disc clockwise, (Fig. 3), as in abnormal condition I, but is of greater magnitude for a given inequality of currents at the two sources.

Abnormal condition IV—Caused by relative increase of current at source $S^5$ and reversal of said current with respect to abnormal condition II.—Next may be traced the several currents and fluxes when the departure from normal condition is caused by the current at the source $S^5$ reversing and becoming larger than normal with respect to the current at source $S^1$.

(A) Assume first the instant when the inner conductor at each source of power is plus. The leg $L^1$ may be disregarded. The leg $L^5$ is of zero potential, so far as the transformer fluxes therein are concerned. The leg $L^3$ is of opposite polarity to leg $L^5$ and is also zero. The flux due to winding OW may be considered as ninety degrees ahead of the transformer fluxes. At the instant in question, the leg $OL^2$ is minus and the leg $OL^4$ is plus. At this instant, then, the $OL^2$, $L^3$, $OL^4$, $L^5$, legs are respectively minus, zero, plus, zero.

(B) Assume now an instant one-quarter cycle later. The two terminals at each source of power are now of zero potential, producing zero current in each primary $X^1$, $X^5$; there is thus plus polarity at leg $L^5$. Since the other flux leads the transformer fluxes by ninety degrees, said other flux is now zero at legs $OL^2$ and $OL^4$. At this instant, then, the legs are respectively zero, minus, zero, plus, which means that the plus polarity has traveled from leg $OL^4$ to leg $L^5$, or in an opposite direction to its direction of travel during the corresponding quarter-cycle A—B during abnormal conditions I and III.

(C) Assume now an instant another one-quarter cycle later. The outer terminal at each source of power is now plus, and the several currents and fluxes are thus one-half cycle behind their directions and values at the initial instant A. The legs are thus now respectively plus, zero, minus, zero, which means that the plus polarity has disappeared from leg $L^5$ and appears at leg $OL^2$.

(D) Assume now an instant another one-quarter cycle later, that is, three-quarters of a cycle later than the condition in paragraph A. The two terminals at each source of power are now of zero potential and the several currents and fluxes are one-half cycle behind their directions and values at the instant indicated in paragraph B above. The legs are thus now respectively zero, plus, zero, minus, which means that the plus polarity has traveled from leg $OL^2$ to leg $L^3$.

(E) Assume now another instant one-quarter cycle later, that is, an entire cycle later than the condition in paragraph A. The legs are now of the same polarity as at the instant in paragraph A, namely, respectively, minus, zero, plus, zero, which means that the plus polarity has traveled from leg $L^3$ to leg $OL^4$.

The disc thus tends to rotate clockwise (Fig. 3).

*Résumé.*—Thus an excess of current at the source of power $S^1$ relative to the current at source $S^5$ (abnormal condition I) causes travel of plus polarity and hence torque in one direction while a relative excess of current at the source of power $S^5$ (abnormal condition II) causes travel of plus polarity and hence torque in the opposite direction. In the latter case, as in the former, the magnitude of said relative excess of current determines the magnitude of the torque, for the reasons above noted. Upon a relative reversal of current at either source (abnormal conditions III and IV), the direction of rotation is unchanged, but the torque produced by a given magnitude of inequality of currents at the two sources is increased.

The apparatus is thus simple in construction, may be made sensitive to small departures from normal condition, and is yet rugged enough to endure severe service conditions.

*In general.*

If during normal condition, the two sources of power of the relay are not in phase with one another, or even relatively reversed, the relay still does not rotate, and, during abnormal conditions, if the two sources of power be out of phase with one another, or even relatively reversed, the direction of rotation will be unchanged. Relative reversal of the currents at the two sources, however, alters the torque developed for a given magnitude of inequality between the two currents.

The above also applies to embodiments of the invention in apparatus other than relays, that is, an out-of-phase relation, or even relative reversal of the currents at the two sources, does not cause the resultant field to travel when the ampere turns in the two primaries are equal, but does cause it to travel in one direction or the other when such ampere turns are unequal. During the former condition, there is a flux through the poles $OL^2$, $OL^4$, but the phase relation of the flux with respect to the transformer fluxes is such that no traveling field is produced.

From the above it will be seen that the several objects of the invention are attained and other advantageous results achieved.

As many modifications of the embodiment above illustrated might be made without departing from the spirit or scope of the present invention, it is intended that the above description and accompanying drawings and claims shall be interpreted as illustrative and not in a limiting sense.

I claim:

1. The method of inducing currents in a conductor, which comprises obtaining fluxes from a plurality of current sources, producing currents by means of said fluxes, of substantially opposite phase to the respective currents of the said current sources, producing a flux from the resultant of said produced currents substantially in quadrature with the said first named fluxes, and combining the several fluxes to produce traveling fields; said traveling fields inducing currents in a conductor.

2. The method of inducing currents in a conductor, which comprises obtaining fluxes from a plurality of current sources, producing currents by means of said fluxes, of substantially opposite phase to the respective currents of the said current sources, combining said produced currents, producing a flux from the resultant of said produced currents substantially in quadrature with the said first named fluxes, and combining the several fluxes to produce traveling fields; said traveling fields inducing currents in a conductor.

3. The method of inducing currents in a conductor, which comprises obtaining fluxes from a plurality of current sources, producing currents by means of said fluxes, of substantially opposite phase to the respective currents of the said current sources, combining said fluxes, and combining said produced currents differentially and directionally, producing a flux from the resultant of said combined currents substantially in quadrature with the said combination of the said first named fluxes, whereby traveling fields are produced; said traveling fields inducing currents in a conductor.

4. The method of inducing currents in a conductor, which comprises obtaining fluxes from a plurality of current sources, producing currents by means of said fluxes, of substantially opposite phase to the respective currents of the said current sources, combining said fluxes, and producing an additional flux from the resultant of said produced currents substantially in quadrature with the said first named fluxes, whereby traveling fields are produced; said traveling fields inducing currents in a conductor.

5. The method of producing forces, which comprise obtaining fluxes from a plurality of current sources, producing currents by means of said fluxes, of substantially opposite phase to the respective currents of the said current sources, producing a flux from the resultant of said produced currents substantially in quadrature with the said first named fluxes, and combining the several fluxes to produce traveling fields; said traveling fields inducing currents in a movable member, the reactions between fluxes caused thereby and said traveling fields tending to move said member.

6. The method of producing forces, which comprises obtaining fluxes from a plurality of current sources, producing currents by means of said fluxes, of substantially opposite phase to the respective currents of the said current sources, combining said produced currents, producing a flux from the resultant of said produced currents substantially in quadrature with the said first named fluxes, and combining the several fluxes to produce traveling fields; said traveling fields inducing currents in a movable member, the reactions between fluxes caused thereby and said traveling fields tending to move said member.

7. The method of producing forces, which comprises obtaining fluxes from a plurality of current sources, producing currents by means of said fluxes, of substantially opposite phase to the respective currents of the said current sources, combining said fluxes, combining said produced currents differentially and directionally, and producing a flux from the resultant of said combined currents substantially in quadrature with the said combination of the said first named fluxes, whereby traveling fields are produced; said traveling fields inducing currents in a movable member, the reactions between fluxes caused thereby and said traveling fields tending to move said member.

8. The method of producing forces, which comprises obtaining fluxes from a plurality of current sources, producing currents by means of said fluxes, of substantially opposite phase to the respective currents of the said current sources, combining said fluxes, producing an additional flux from the resultant of said produced currents substantially in quadrature with the said first named fluxes, whereby traveling fields are produced; said traveling fields inducing currents in a movable member, the reactions between fluxes caused thereby and said traveling fields tending to move said member.

9. In apparatus of the class described, means for obtaining fluxes from a plurality of current sources, means for producing by means of said fluxes currents of substantially opposite phase to the respective currents of the said current sources, means for producing a flux from the resultant of said produced currents substantially in quadrature with the said first named fluxes, and means for combining the several fluxes to produce traveling fields.

10. In apparatus of the class described, means for obtaining fluxes from a plurality of current sources, means for producing by means of said fluxes currents of substantially opposite phase to the respective currents of the said current sources, means for producing a flux from the resultant of said produced currents substantially in quadrature with the said first named fluxes, means for combining the several fluxes to produce traveling fields; and means responsive to said traveling fields.

11. In apparatus of the class described, means for obtaining fluxes from a plurality of current sources, means for producing by means of said fluxes currents of substantially opposite phase to the respective currents of the said current sources, means for producing a flux from the resultant of said produced currents substantially in quadrature with the said first named fluxes, means for combining the several fluxes to produce traveling fields; a movable member; and means whereby said traveling fields tend to cause movement of said member.

12. In apparatus of the class described, means for obtaining fluxes from a plurality of current sources, means for producing by means of said fluxes currents of substantially opposite phase to the respective currents of the said current sources, means for producing a flux from the resultant of said produced currents substantially in quadrature with the said first named fluxes, means for combining the several fluxes to produce traveling fields; a movable member; and means whereby said traveling fields tend to cause movement of said member, the magnitude and direction of the force tending to cause said movement being dependent upon the phase relationship and relative magnitude of the currents in said sources.

13. In apparatus of the class described, means for obtaining fluxes from a plurality of current sources, means for producing by means of said fluxes currents of substantially opposite phase to the respective currents of the said current sources, and means for combining said produced currents, means for producing an additional flux from the resultant of said combined currents, substantially in quadrature with the said first named fluxes, whereby traveling fields are produced.

14. In apparatus of the class described, means for obtaining fluxes from a plurality of current sources, means for producing by means of said fluxes currents of substantially opposite phase to the respective currents of the said current sources, means for combining said produced currents, means for producing an additional flux from the resultant of said combined currents, substantially in quadrature with the said first named fluxes, whereby traveling fields are produced; and means responsive to said traveling fields.

15. In apparatus of the class described, means for obtaining fluxes from a plurality of current sources, means for producing by means of said fluxes currents of substantially opposite phase to the respective currents of the said current sources, means for combining said produced currents, means for producing an additional flux from the resultant of said combined currents, substantially in quadrature with the said first named fluxes, whereby traveling fields are produced; a movable member; and means whereby said traveling fields tend to cause movement of said member.

16. In apparatus of the class described, means for obtaining fluxes from a plurality of current sources, means for producing by means of said fluxes currents of substantially opposite phase to the respective currents of the said current sources, means for combining said produced currents, means for producing an additional flux from the resultant of said combined currents, substantially in quadrature with the said first named fluxes, whereby traveling fields are produced; the magnitude of the force tending to cause said movement being dependent upon the phase relationship and relative magnitude of the currents in said sources.

17. In apparatus of the class described, means for obtaining fluxes from a plurality of current sources, means for producing by means of said fluxes currents of substantially opposite phase to the respective currents of the said current sources, means for combining said fluxes, means for combining said produced currents differentially and directionally, means for producing a flux from the resultant of said combined currents substantially in quadrature with the said first named fluxes, whereby traveling fields are produced; and means responsive to said traveling fields.

18. In apparatus of the class described, in combination, two transformers; a primary winding on each transformer, said windings being adapted to be energized respectively from two sources of current; a winding energized differentially and directionally from said transformers and adapted to produce a flux substantially in quadrature with the transformer fluxes; and means for combining the transformer fluxes with said first flux to produce resultant fields.

19. In apparatus of the class described, in combination, two transformers; means for combining the transformer fluxes; a primary winding on each transformer, said windings being adapted to be energized respectively from two sources of current; means energized differentially and directionally from the secondary windings of said transformers for producing a flux substantially in quadrature with the transformer fluxes; means for combining the transformer fluxes with said other flux to produce traveling fields; and means responsive to said traveling fields.

20. In apparatus of the class described, in combination, a magnetic core member, transformers each having a primary winding adapted to be connected to separate sources of power, secondary windings for each of said transformers cross-connected with one another, all of said windings being wound on said core member, and an additional winding on said core member adapted to be connected to normally equipotential points of said secondary circuit, whereby the resultant flux produced by said transformers is substantially in quadrature with the flux produced by said additional winding, whereby traveling fields are produced; and means responsive to said traveling fields.

21. In an apparatus of the class described, in combination, two induction devices, primary and secondary windings therefor, said primary windings adapted to be energized from two sources of power, and means cooperating with said secondary windings and energized from the differential and directional co-action of said windings, for setting up traveling magnetic fields.

22. In apparatus of the class described, in combination, a plurality of transformers; a primary winding on each transformer, said windings being adapted to be energized from sources of current; means energized differentially and directionally from said transformers and adapted to produce a flux substantially in quadrature with the transformer fluxes; and means for combining the transformer fluxes with said first flux to produce resultant fields.

23. In apparatus of the class described, in combination, a plurality of transformers; means for combining the transformer fluxes; a primary winding on each transformer, said windings being adapted to be energized from sources of current; means energized differentially and directionally from the secondary windings of said transformers for producing a flux cooperating with the transformer fluxes to produce traveling fields; and means responsive to said traveling fields.

24. In apparatus of the class described, in combination, a magnetic core, transformers each having a primary winding adapted to be connected to a source of power, secondary windings for each of said transformers, a secondary circuit cross-connecting said secondary windings, all of said windings being wound on said core, and an additional winding on said core adapted to be connected to points on said secondary circuit, whereby the resultant flux produced by said transformers is substantially in quadrature with the flux produced by said additional winding, whereby traveling fields are produced; and means responsive to said traveling fields.

25. In an apparatus of the class described, in combination, a plurality of transformers, primary and secondary windings therefor, said primary windings adapted to be energized from sources of power, and means cooperating with said secondary windings and energized from the differential and directional co-action of said windings, for setting up traveling magnetic fields.

In testimony whereof, I have signed my name to this specification this ninth day of May, 1921.

ROLLIN N. CONWELL.